United States Patent [19]
Weber

[11] 4,405,884
[45] Sep. 20, 1983

[54] SHAFT POSITION SYNCHRONIZATION MEANS FOR MULTIPLE SYNCHRONOUS INDUCTION MOTORS

[76] Inventor: Harold J. Weber, 20 Whitney Dr., Sherborn, Mass. 01770

[21] Appl. No.: 257,575

[22] Filed: Apr. 27, 1981

[51] Int. Cl.³ .............................................. G05B 19/28
[52] U.S. Cl. ...................................... 318/85; 318/78; 318/625; 318/675
[58] Field of Search .................... 318/85, 675, 78, 625

[56] References Cited

U.S. PATENT DOCUMENTS

| | | | |
|---|---|---|---|
| 3,757,179 | 9/1973 | Pedersen | 318/85 |
| 3,967,170 | 6/1976 | MacDonald et al. | 318/85 |
| 3,997,828 | 12/1976 | Bottcher et al. | 318/85 X |
| 4,093,904 | 6/1978 | Burig et al. | 318/616 X |
| 4,135,118 | 1/1979 | Seeger et al. | 318/85 |
| 4,259,621 | 3/1981 | Jakobson et al. | 318/85 |
| 4,310,787 | 1/1982 | Seeger et al. | 318/78 X |

*Primary Examiner*—B. Dobeck

[57] ABSTRACT

The exact shaft angle position synchronization of two or more ordinary synchronous induction motors is provided. One motor, serving as the master, is powered directly from a source of alternating current. Each additional motor, which may be of a different size or type, is slaved to the intrinsic rotational speed of the master through the inherent electrical speed synchronization wrought by being excited by a common alternating current power source. Each slave motor is further synchronized by this invention to attain, and subsequently hold, an exact angular shaft position relative to the master. The position of the master and each slave motor shaft position is constantly measured, thereby producing several trains of electrical pulses which are compared. When an error exists, an electrical signal is produced which acts with the a.c. excitation applied to the slave motor so as to controllably retard its rotational velocity, thereby causing the angular shaft position to the slave motor to slip, or be retarded, relative to the angular position of the master motor shaft. When the angle of the slave has slipped sufficiently, and generally less than 360 degrees, the pulse train produced by the master and the slave achieve momentary coincidence and the electrical retardation of the slave motor ceases. The subsequent result is a mechanical synchronization of the angular shaft position of each motor, which is then maintained in that useful relationship by the nature of their common speed synchronization with the alternating current source frequency.

31 Claims, 15 Drawing Figures

FIG. 4 MASTER   FIG. 3   FIG. 5 SLAVE

SHAFT POSITION SYNCHRONIZATION MEANS FOR MULTIPLE SYNCHRONOUS INDUCTION MOTORS

SUMMARY

The synchronization of several rotating mechanical devices at the same speed, or rotational velocity, is commonly accomplished through the use of synchronous alternating current (a.c.) motors. Through the use of a.c. motors which are speed synchronous relative to the a.c. power frequency, no direct mechanical connection, other than electrical wiring, need exist between the individual mechanical devices. Therefore, the motor driven devices may be located separately and yet act as though they are physically linked together.

The instant invention improves on this speed, or rotational velocity synchronization through additionally providing exact angular position synchronization between the key rotating member of each a.c. motor. The synchronization is provided through the designation of one motor as the MASTER, while each additional motor which must be angularly synchronized with the MASTER is provided as a SLAVE. In each case, the motor may be a different size or kind of a.c. synchronous motor and of ordinary design.

The MASTER and each SLAVE are fitted with shaft angle position sensors which provide an electric signal usually denotative of the shafts desired lock-in, or "zero" index position. The MASTER signal is brought together with each SLAVE signal in an electrical combining circuit which produces at least an ERROR signal when the respective SLAVE is not angularly synchronized with the controlling MASTER. This ERROR signal acts to disrupt the speed of the SLAVE motor, allowing angular shaft position slippage relative to the instant shaft position of the MASTER until angular synchronization is achieved. When angular synchronization, or lock-in occurs, the ERROR signal ceases and the SLAVE motor rotates synchronously with the MASTER motor, keeping an exact angular shaft position relationship therebetween.

It is therefore a purpose of the invention to provide exact angular, as well as rotational velocity synchronization between two or more electric motor machines.

A further purpose of the invention is to teach a method whereby a SLAVE motor may be brought into exact angular, as well as rotational velocity synchronization with a MASTER motor rotating member.

Yet another intent of the invention shows means for controllably retarding the normal angular rotational velocity of a SLAVE motor shaft member relative to a MASTER motor shaft member, thereby establishing at a subsequent instant of time a period of exact angular synchronization between the shaft members whereupon the retardation of the SLAVE motor is stopped and the SLAVE motor shaft immediately resumes running at its predetermined normal rotational velocity which keeps it in exact angular synchronization with the MASTER motor shaft member.

The teaching also shows several effective means for producing controllable retardation of the SLAVE motor shaft member rotational velocity.

Brought forth also is preferred control means for accomplishing the essence of the invention which is both efficient at producing angular shaft position between several electric motors, and is low in cost.

These and other important improvements wrought by the instant invention will become apparent to the artisan in the ensuing description and claims.

DESCRIPTION OF THE INVENTION

Figure 1:
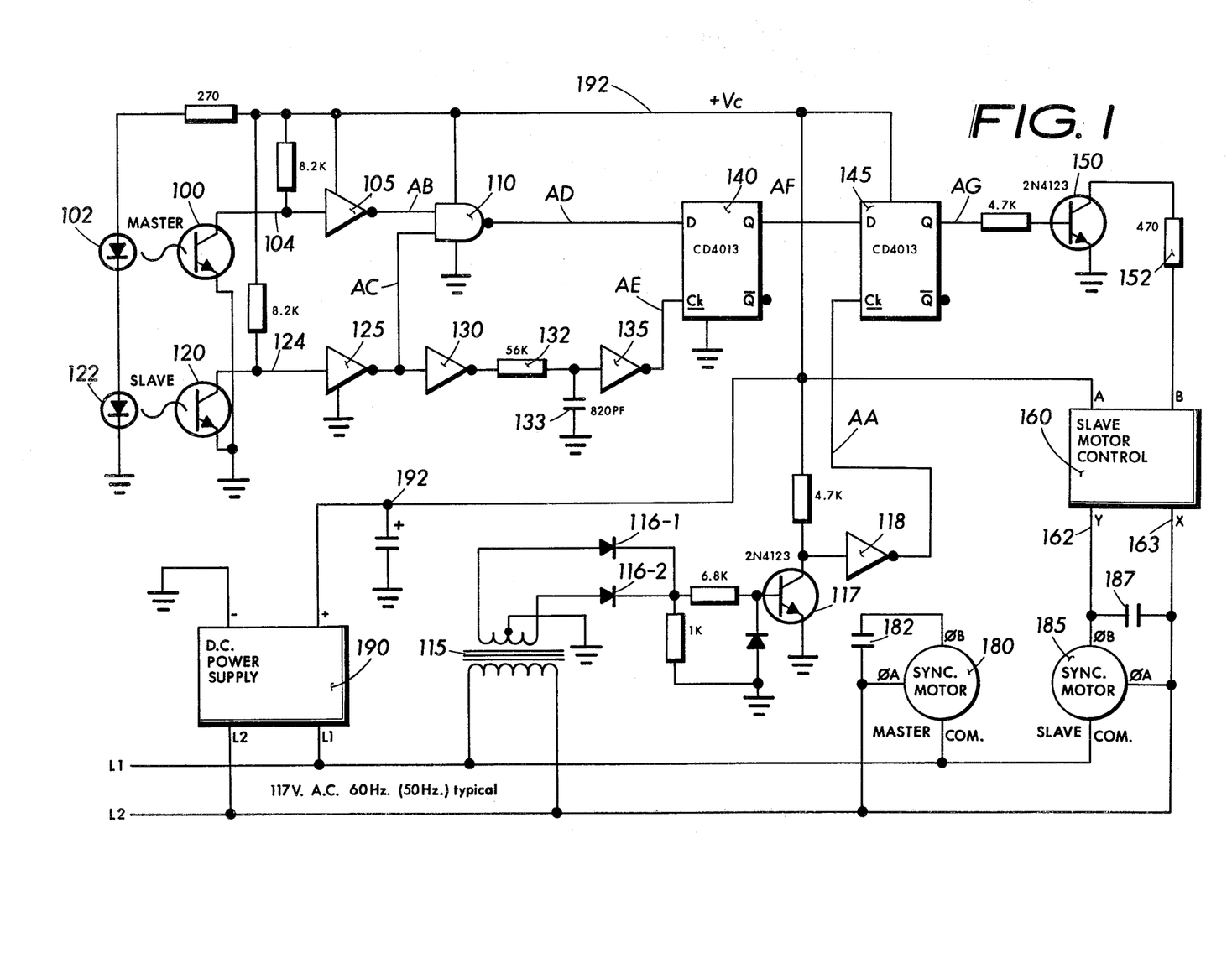
FIG. 1 Electrical diagram for a preferred embodiment including the essence of the invention.

The preferred embodiment for the instant invention appears in FIG. 1. Alternating current power is coupled into the apparatus on lines L1, L2. This power excites the MASTER synchronous motor 180, including the usual phase shift condensor 182. The master motor thus runs at a synchronous speed related to the a.c. power frequency by:

$$\frac{60 \cdot 2F}{n} = RPM$$

where:
F = a.c. power frequency
n = number of motor (stator) poles
RPM = shaft speed (revolutions/minute)

In this definition, a synchronous motor is an electric machine which provides a shaft member which rotates at some exact integral multiple of the power line frequency, thereby maintaining a constant phase relationship between the motor shaft position and the a.c. power cycle waveform. Furthermore, an induction motor is an electric machine which provides a shaft member which rotates subsynchronously with the power line frequency, e.g. not quite as fast as the synchronous speed. As a practical matter, when fed from 60 hertz power, a two pole synchronous motor shaft speed is exactly 3,600 RPM, whereas a two-pole induction motor shaft speed is usually on the order of 3,000 to 3,450 RPM.

The SLAVE synchronous motor 185, together with the phase shift condensor 187 also receives a.c. power from the input lines L1, L2. The phase ØA and ØB connection of the motor 185 also couples 162, 163 with the slave motor control 160.

The transformer 115 couples through diodes 116-1, 116-2 to the function of a pair of resistors and to the base of NPN transistor 117. The transistor base is normally biased "on" by conduction throughout the power cycle by way of either diode 116-1 or 116-2 except when the power cycle is near zero crossover, when base bias briefly ceases. This causes an abrupt, albeit brief, transition of the collector with the result that a narrow negative going pulse appears at the output of the C-MOS inverter 118 with a repetition rate twice that of the power line frequency.

Figures 3, 5:
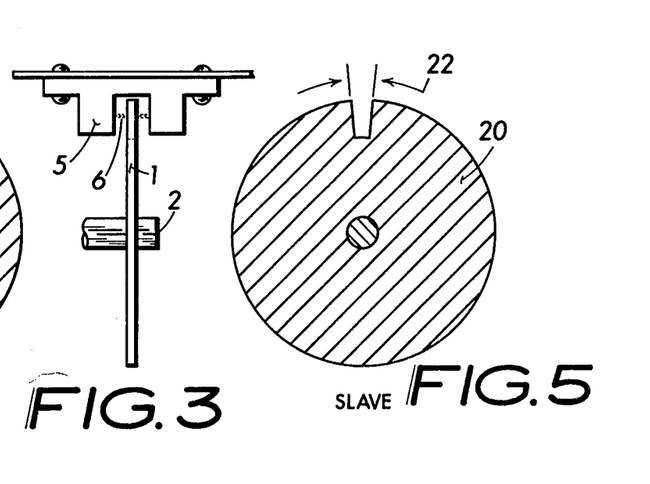
FIG. 3 Orientation of rotating motor synchronization shutter relative to an optical coupler module.
FIG. 5 Typical construction of SLAVE motor synchronization shutter.
Figure 4:
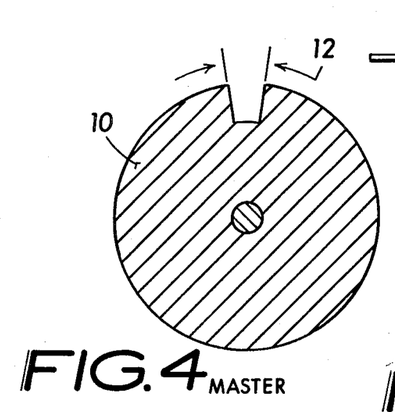
FIG. 4 Typical construction of MASTER motor synchronization shutter.

The MASTER motor and the SLAVE motor each have shutter devices attached to their respective rotating member shafts. In FIG. 3, the motor shaft 2 appears supporting a shutter 1 which, in the inventor's model served to selectively interrupt the light path 6 provided between a light emitting diode and a phototransistor, usually provided as a unitary optocoupler device 5, such as the General Electric type H13B1. The master shutter 10 configuration is shown in FIG. 4, whilst the SLAVE shutter 20 appears in FIG. 5. What is most particularly essential is the preferred arrangement where the aperture, or light path permitting opening 12 is of longer angular duration in the MASTER shutter 10 than that of the opening 22 duration in the SLAVE shutter 20.

Figure 2:
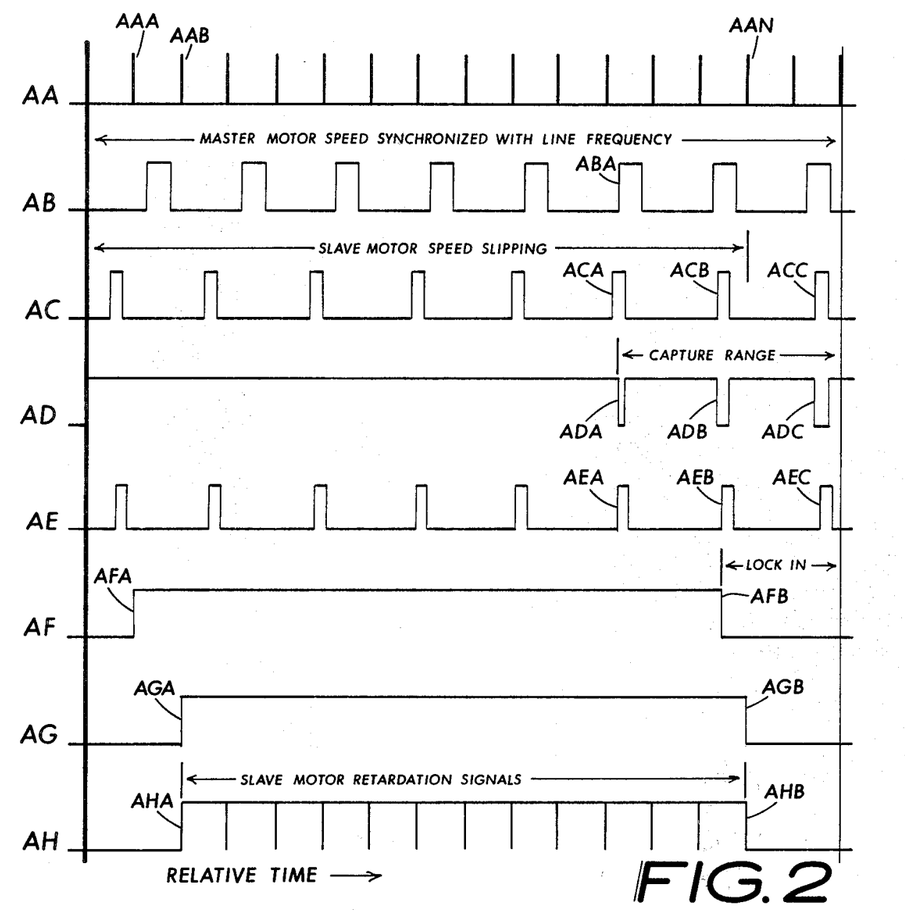
FIG. 2 Waveform representations for the electric signals effective at key circuit points in FIG. 1.

This relationship of pulse duration produced by the difference in shutter opening angular duration is shown in the waveform representations of FIG. 2. The MASTER pulses produced by the phototransistor is shown as signal AB, having a somewhat longer HIGH state ON level than signal AC produced by the SLAVE sensor phototransistor.

Figures 7, 8:
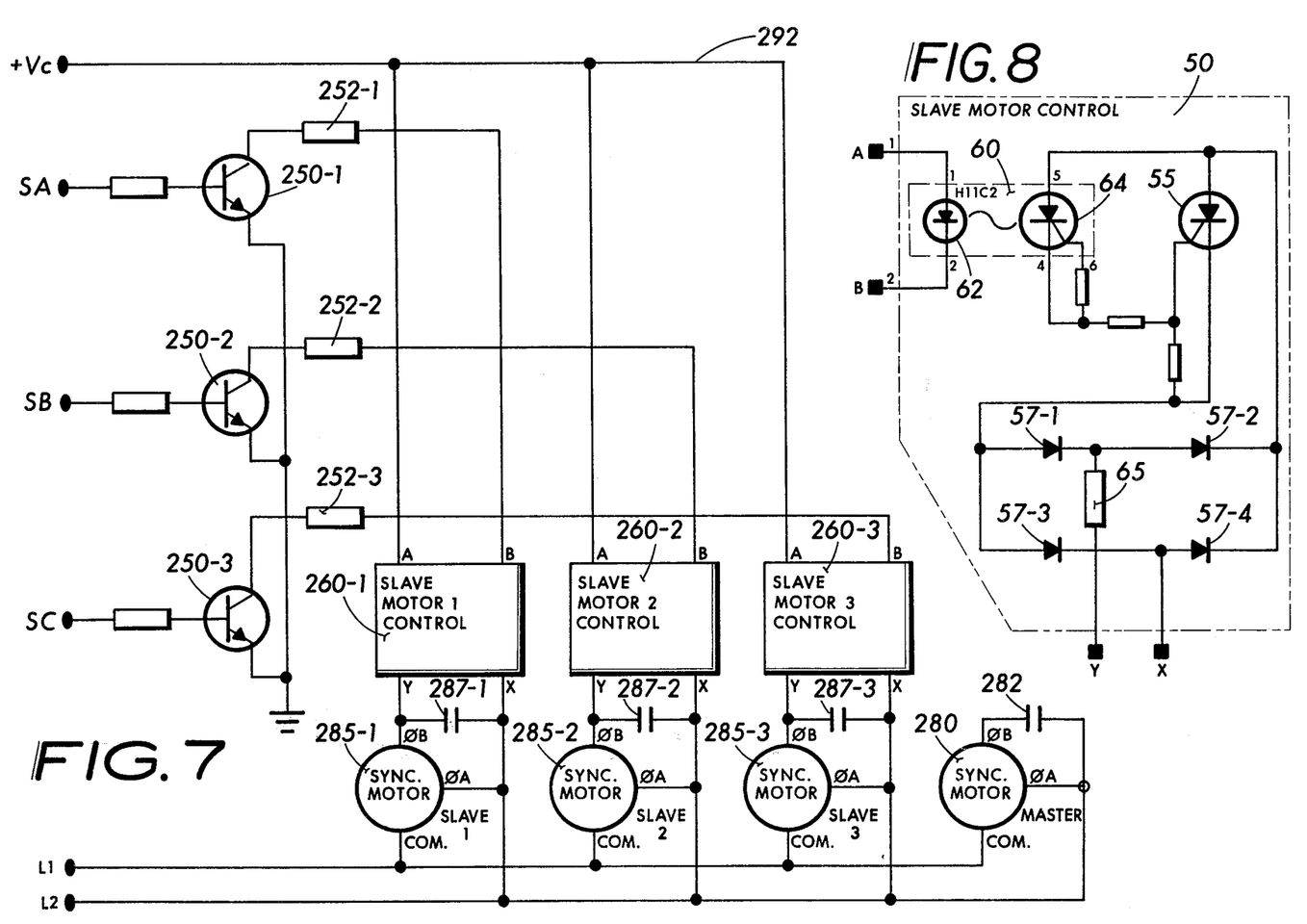
FIG. 7 Electrical diagram continuation of FIG. 6 showing connection with MASTER and several SLAVE motors.
FIG. 8 Electrical diagram for a SLAVE motor control switch device.

The connection of the two sensor light emitting diodes (L.E.D.) 102, 122 to $+V_c$ through a resistor is shown in FIG. 1. The MASTER phototransistor 100 produces a NEGATIVE pulse on line 104 when the light path is allowed between the L.E.D. 102 and the phototransistor 100, therefrom being inverted 105 producing signal AB at one input of NAND gate 110. In a like way the SLAVE photo transistor 120 produces a NEGATIVE pulse on line 124 when the light path is allowed between the L.E.D. 122 and the phototransistor 120, therefrom being inverted 125 producing signal AC at the other input of NAND gate 110 and also coupled with inverter 130 which together with the integration (e.g., time delay) provided by resistor 132 and condensor 133, together with inverter 135 serves to produce a slightly delayed signal AE similar to signal AC. Signal AE couples to and serves to CLOCK the "D" flip-flop 140. The result is that when the MASTER and the SLAVE are not in synchronization the instant signal states at the input of the NAND gate will be able to produce a LOW signal AD on the output of gate 110 which is coincident with the LEADING (positive) edge of signal AE only when the MASTER and the SLAVE shutter openings are in angular phase coincidence. When this coincidence is lacking, the NAND gate 110 output is HIGH when the signal AE clocks the "D" flip-flop 140, transferring the HIGH state of the Q output, thus to the "D" input of flip-flop 145. In turn, flip-flop 145 is clocked by signal AA just after zero-crossover of the a.c. power on lines L1, L2. When the HIGH state is clocked through flip-flop 145, the signal AG turns ON transistor 150 to activate a L.E.D. 62 in the General Electric H11C2 optical coupler 60 as shown in FIG. 8, which includes a trigger thyristor 64 which turns ON the control thyristor 55, resulting in bidirectional current flow between the "X" and "Y" terminal by way of the diode bridge comprising elements 57-1, 57-2, 57-3, 57-4. The resistor 65 is then effectively shunted across the condensor 187 associated with the motor 185. This spoils the torque and other running characteristics of the motor 185, resulting in angular slipping of the instant shaft position of the motor relative to its normal angular position. This phase upset of the motors ØB excitation relative to ØA is one of the essential parameters permitting ready angular resynchronization of the SLAVE motor with the MASTER motor.

When the SLAVE motor slips sufficiently to bring the MASTER and SLAVE shutter openings into angular coincidence, the instant logic signals AB, AC coupled to NAND gate 110 will be HIGH, producing a momentary LOW signal AD which is coincident with the clocking effect of signal AE on flip-flop 140. This results in a LOW output being transferred to the transistor 150 base, resulting in a cessation of collector current flow through resistor 152 and the L.E.D. 62. The result is thyristor 55 turns OFF, and the ØB excitation on motor 185 returns to normal. The motor 185 then runs synchronously at the same relative speed as motor 180 and the exact angular shaft position relationship is held constant.

In the event the SLAVE motor is induced to lose its correct angular relationship relative to the master, resynchronization will again be repeated as described for initial snychronization.

The FIG. 2 waveforms illustrate typical circuit operation for the circuit of FIG. 1. The clock pulses are shown AA and correspond with the output of inverter 118. The MASTER synchronous motor reference pulse signal is shown AB, while the SLAVE reference pulse signal AC is shown where the relative timing between pulses AB and AC is sliding, or skewing, i.e. the repetition rate of AC is slightly less due to SLAVE motor retardation. When initial coincidence is reached, as between ABA and ACA, a pulse ADA is produced. When full coincidence of ACB is reached relative to ABB, pulse ADB is transferred through flip-flop 140 to produce the LOCK-IN signal AFB, while the AFB state is transferred through flip-flop 145 to produce control signal AGB on the next CLOCK pulse AAN. This shuts off the retardation signal AHB.

Figure 6:
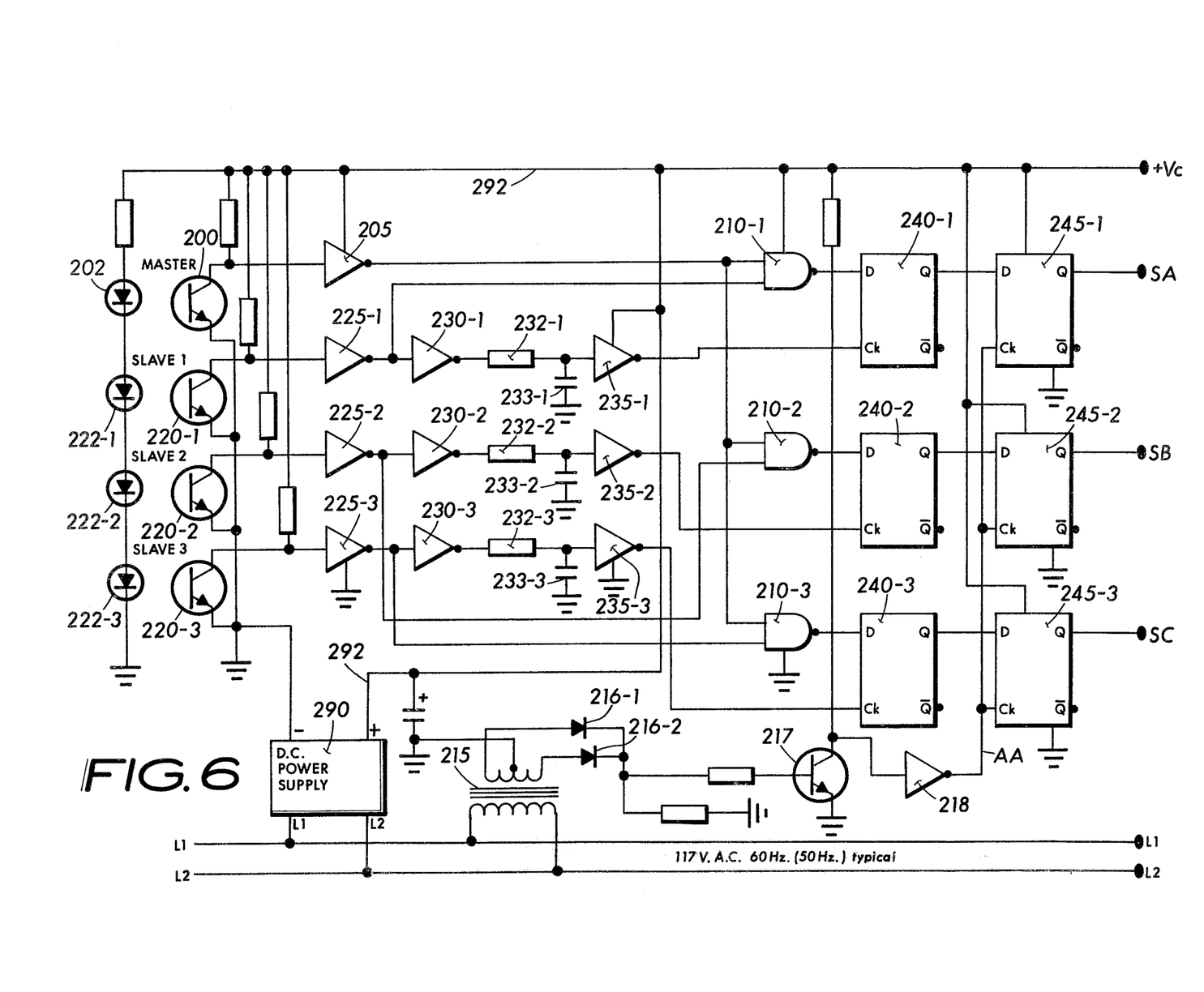
FIG. 6 Electrical diagram for a preferred embodiment capable of synchronizing several (three) SLAVE motors.

The circuit of FIG. 6 shows how several (for example, three) SLAVE motors can be angularly synchronized with a common MASTER motor. Each motor includes a photo-coupled 5 and shutter 1 arrangement similar to that depicted in FIG. 3. The action of the MASTER L.E.D. 202 and phototransistor 200, together with inverter 205 and NAND gate 210-1 is equivalent to the like elements of FIG. 1. In the same way the L.E.D. 222-1, phototransistor 220-1, inverters 225-1, 230-1, 235-1, and elements 232-1, 233-1 correspond with like elements of FIG. 1. This effects a similar control timing of signal states through flip-flops 240-1, 245-1 which brings about the angular synchronization of the SLAVE 1 motor with the MASTER.

Angular synchronization for SLAVE 2 and SLAVE 3 motor is similar. L.E.D. 222-2, 222-3 correspond with phototransistors 220-2, 220-3 which couple through the inverters 225-2, 225-3, 230-2, 230-3, 235-2, 235-3 together with timing elements 232-2, 232-3, 233-2, 233-3, NAND gates 210-2, 210-3 serve as phase coincidence detectors, with the outputs therefrom coupled through the synchronization signal transfer flip-flops 240-2, 240-3, 245-2, 245-3. D.C. power on bus 292 is provided from supply 290, whilst CLOCK pulses are adapted from the a.c. power line through trnasformer 215, together with diodes 216-1, 216-2, transister 217, and inverter 218, producing a signal AA which clocks the three flip-flops 245-1, 245-2, 245-3. The SA, SB, SC outputs couple to FIG. 7 into the base of each respective NPN transistor 250-1, 250-2, 250-3. The respective collectors connect through ballast resistors 252-1, 252-2, 252-3 to the L.E.D. element in each motor control function 260-1, 260-2, 260-3 each of which acts to spoil the phase shift of ØB for each SLAVE motor 285-1, 285-2, 285-3 normally produced by condensors 287-1, 287-2, 287-3. In about the same electrical response action as described for FIG. 1, each SLAVE motor is brought into angular phase lock with the MASTER motor 280, which together with condensor 282 runs at a constant, frequency-stabilized, speed. Each motor control function 260-1, 260-2, 260-3 may comprise the elements of FIG. 8.

Figure 9:
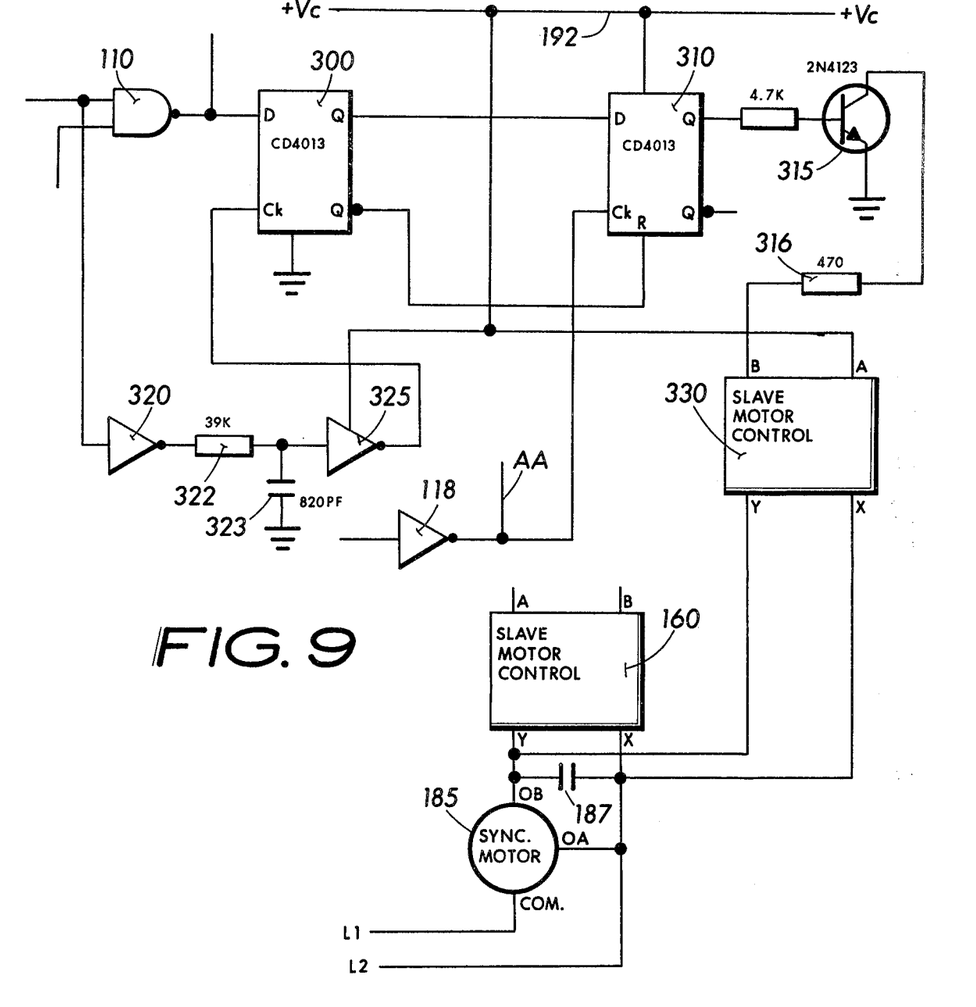
FIG. 9 Partial electrical diagram for adapting the circuit of FIG. 1 to provide two levels of retardation of the SLAVE motor speed.

The bilevel control of a slave motor 185 is depicted in FIG. 9. The circuit of FIG. 1 is adapted to provide rapid speed skewing of the slave motor error until lock-in is about reached, wherein the motor speed slippage rate is reduced, and the error is closed-in by small incremental speed skewing. As shown, the circuit detail of FIG. 9 adds onto the circuitry of FIG. 1. Two extra flip-flops 300, 310 are used with flip-flop 300 receiving its DATA input signal from the output of the NAND gate 110, whilst the CLOCK signal therefore is provided by inverters 320, 325 together with timing elements 322, 323 which collectively act to delay the MASTER pulse signal AB from the output of inverter 105. When the angular error is large, motor control 330 is energized by transistor 315 through ballast 316. The control 330 is predetermined to introduce a large ØB error into motor 185 causing rapid, extensive speed skew. When the MASTER and SLAVE shutter signals reach initial coincidence, e.g. the capture range, control 330 is disabled and control 160 effects a lesser predetermined amount of motor skew until exact angular lock is achieved.

Figure 10:
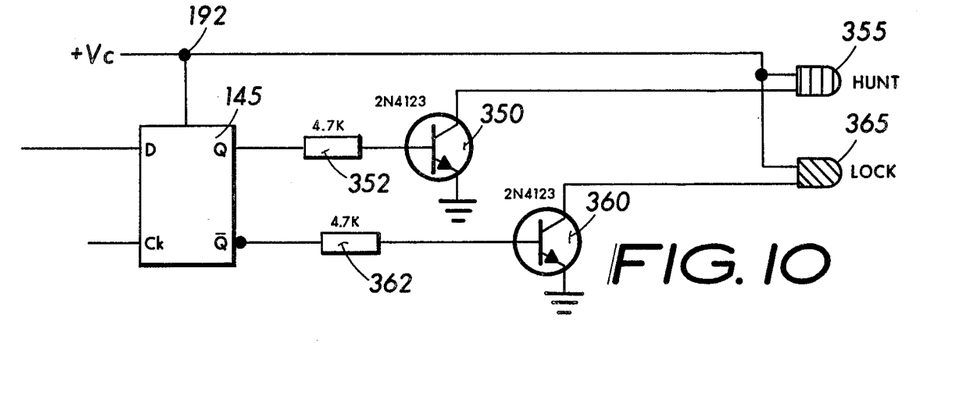
FIG. 10 Connection to provide HUNT and LOCK indicator lights.

Indication of control status is provided by the circuit detail of FIG. 10. When the controller is HUNTING, the Q output of flip-flop 145 is HIGH, turning on transistor 350 and thus pilot light 355. When LOCK-IN is achieved, the flip-flop 145 states reverse and Q is HIGH, turning on transistor 360 and thus pilot light 365.

The accuracy of angular lock-in, or synchronization is determined by several inherent factors. The difference between the opening 12 and opening 22 in the motor shutters 10, 20 describes the lock-in range. When the two are very nearly the same, but with opening 12 slightly larger, the angular correction and synchronization is the most precise. However, the skew control enters in, and if the skew is too rapid or in relatively large steps, the lock-in range of the shutters will overshoot and excessive lock-in hunting will occur. Furthermore, the natural synchronous lock position for some types of motors can create a pattern which causes the shutter lock-in conditions to jump out of coincidence for no apparent reason, or else be hard to capture in the first place. Therefore, the opening overlap of shutter 12 relative to shutter 22 must be predetermined by the artisan to meet the overall stability conditions of the system, including the controller effect, the motor response, and the load damping effect.

Figure 11:
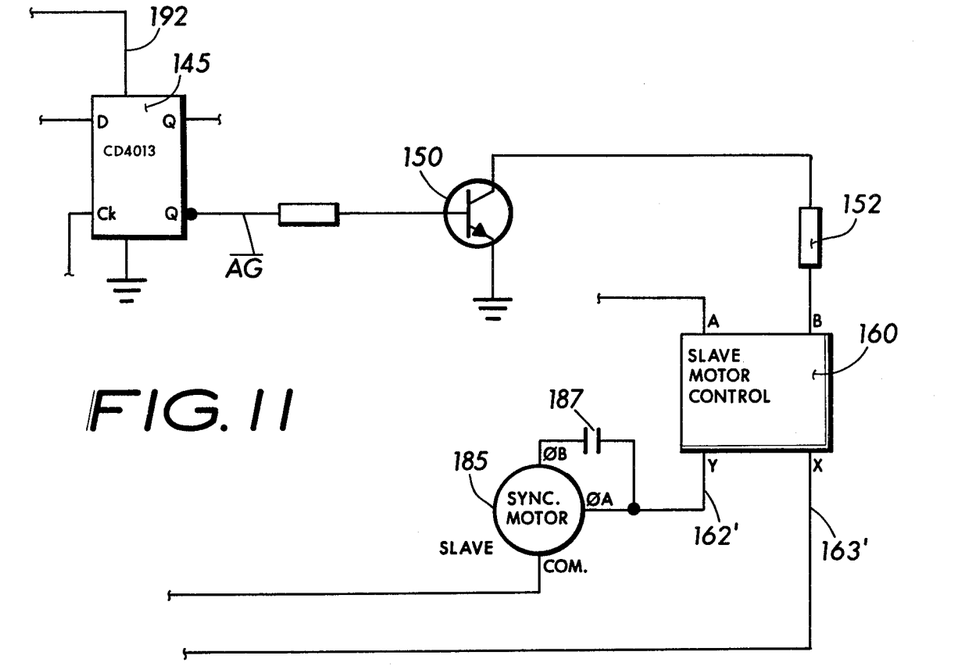
FIG. 11 Adaptation for the circuit of FIG. 1 to provide interruption of power to the SLAVE motor to provide speed retardation.

The brief interruption of a.c. power flow to the SLAVE motor to effect speed skewing is shown in FIG. 11. The transistor 150 base couples to the $\overline{Q}$ output of flip-flop 145 of FIG. 1, receiving a signal AG which turns transister 150 OFF when the motor skews, or is hunting. This serves to shut off power flow through the motor control 160 which is similar to the form depicted in FIG. 8 except that resistor 65 is omitted, or of very low resistance value. When LOCK-IN is reached, the $\overline{Q}$ output $\overline{AG}$ goes HIGH and the motor control turns ON, coupling normal a.c. power to the motor 185.

Figure 12:
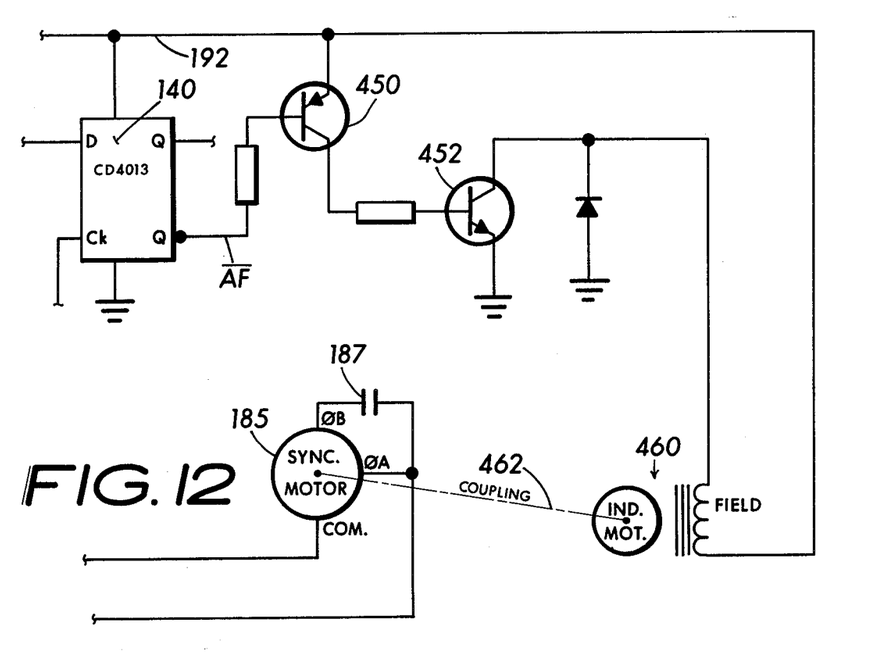
FIG. 12 Adaptation for the circuit of FIG. 1 to provide mechanical drag or temporary overload of the SLAVE motor by an electric brake.

The electrical drag-braking of the synchronous motor 185 is shown in FIG. 12. An ordinary induction motor is known to provide a strong drag, or resistance to shaft rotation, when the field is d.c. excited. Therefore, the induction motor 460 is mechanically coupled 462 to the motor 185 rotating member. When hunting, the flip-flop 140 Q LOW output $\overline{AF}$ couples through PNP transistor 450 and NPN transistor 452 to provide d.c. current in the drag motor 460 field winding. Thus, briefly imparted braking action is brought to play on the motor 185 which can cause it to break away from pole-lock, and slip or skew pole-to-pole and therefore decrease in rotational velocity or speed. The choice of the SLAVE motor characteristic must be predetermined in that it must allow fairly smooth pole breakaway when the load torque limit is exceeded, or else excessive hopping or overall erratic behavior can result. The inertia of the load is preferably high for best control effect using the braking method. There is no advantage to "zero cross" synchronization in this method, and therefore all the line frequency clock circuits for signal AA and flip-flop 145 may be detected from the hookup of FIG. 1.

Figure 13:
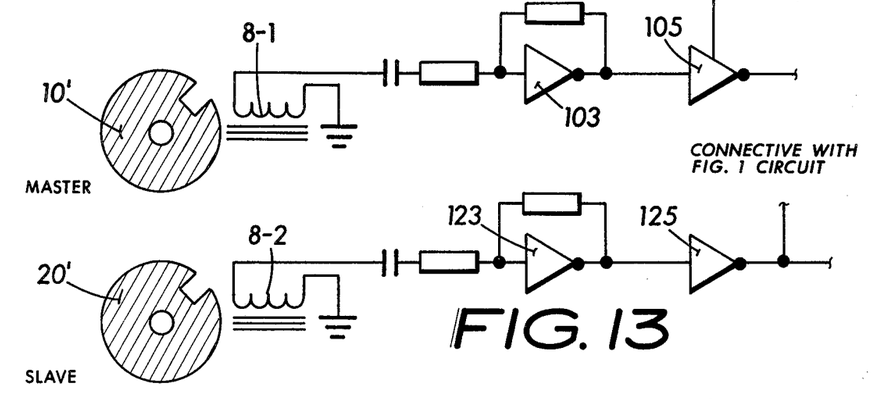
FIG. 13 Adaptation for the circuit of FIG. 1 providing magnetic sensing of shaft position.

The synchronization signals are generated through the use of inductive pickup devices 8-1, 8-2 in FIG. 13. The notch, or discontinuity, in the rotating MASTER and SLAVE synchronization shutters 10', 20' produces a corresponding electric pulse signal which is amplified 103, 123 and connected to the logic level inverters 105, 125.

Figure 14:
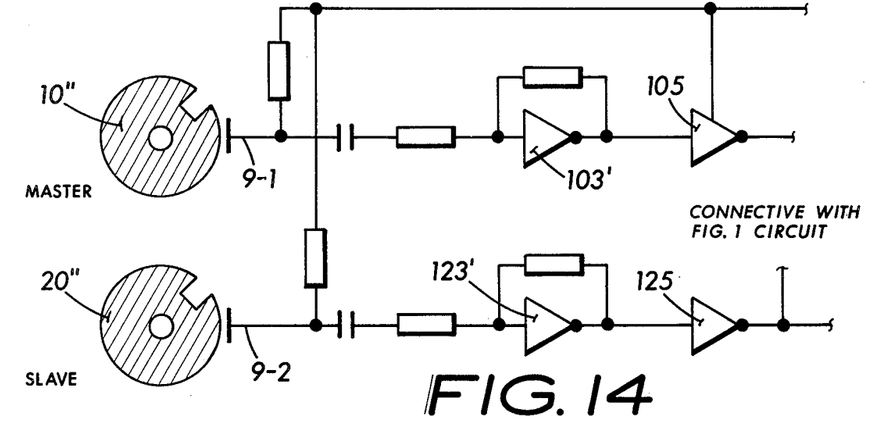
FIG. 14 Adaptation for the circuit of FIG. 1 providing electrostatic sensing of shaft position.

In FIG. 14 the synchronization signals are generated through the use of capacitive pickup probe devices 9-1, 9-2 situate near the rotating MASTER and SLAVE synchronization shutters 10", 20". The voltage change developed across the probe due to the abrupt change in capacitance between the notch, or open part of the shutter and the solid part is amplified 103', 123' to produce logic level pulse signals which couple to the inverters 105, 125.

Figure 15:
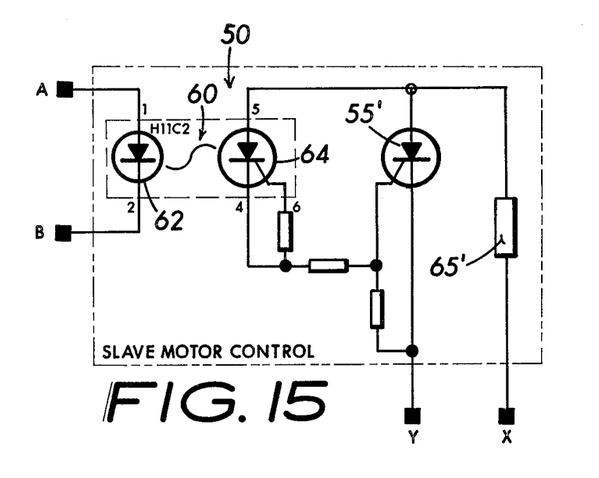
FIG. 15 Adaptation for the circuit of FIG. 1 providing d.c. current through the $\phi$B SLAVE motor winding, thereby producing electrodynamic drag and speed retardation.

The retardation of the speed of the synchronous motor through the expedient of introducing a unipolar or pulsating d.c. voltage in the ØB winding in combination with the phase shifted ØB a.c. power signal is shown in FIG. 15, when used in combination with the circuit of FIG. 1. The optocoupler thyristor 64 couples between the anode and gate of a power s.c.r. 55'. The s.c.r. is connected directly in series with the resistor 65', and substantially in parallel with capacitor 187 as shown in FIG. 1. The effect is that, due to the unidirectional character of the s.c.r., a d.c. level is produced through the ⌀B motor winding which serves to retard the motors torque characteristics and speed.

While particularly shown for use with synchronous motors, the teaching is applicable to non-synchronous induction motors of similar design, e.g. squirrel cage rotor induction motors, etc. The essential requirement for ordinary induction motors is that they be provided with a well dampened load which intrinsically causes each the MASTER and the SLAVE to run near the same speed, with the MASTER predetermined to unconditionally run no faster than the SLAVE.

While the teaching particularly shows a combination of semiconductor control elements in a unique arrangement, this is by no way limiting as to the choice which may be allowed a practitioner of this invention without departing from the essence of the control method.

The change of element combinations to bring about the described effect, and the method for achieving this effect, may undergo alteration by a skilled artisan and yet this shall not construe departure from the central essence of the invention's method for achieving relative angular shaft position synchronization between at least two electric motor driven machines.

The obvious use of sensor means and shutter means other than those described is well within the scope of this invention.

It shall be furthermore obvious that the method for spoiling the slave motor speed need not be limited to the shown method, but may also include conventional means such as brief power interruptions, electrically actuated braking, and other speed change adaptive methods.

What is claimed is:

1. Motor shaft angle synchronization method effective to produce a state of relative angular conincidence between the rotating shaft positions of a master and at least one slave alternating current induction motor operating from a common frequency power signal, through the combination of:
   a. operating all said induction motors from the common frequency power signal thereby substantially locking the relative rotational rates therebetween;
   b. receiving a leading shaft position signal from the master;
   c. receiving a following shaft position signal from each slave;
   d. adapting the leading signal in combination with each following signal to effectively produce a control signal from each combination that is superimposed upon the relatively constant frequency said power signal exciting each slave motor thereby serving to intermittently retard the normal substantially synchronous shaft speed of the correspondent slave to bring about sufficient slippage of the instant shaft position of the slave relative to the master to produce angular coincidence therebetween; and,
   e. inhibiting said control signal retardation effect when angular coincidence between the master and the slave is achieved.

2. Motor synchronization method of claim 1 wherein the normal said rotational rates of the motors are each directly proportional to the power signal frequency.

3. Motor shaft angle synchronization apparatus effective to provide relative angular coincidence between the instant rotating shaft member positions of a master and at least one slave alternating current induction motor means; comprising:
   a. alternating current power source;
   b. master motor means coupled with said source, providing a rotating shaft member therefrom usually coupled to a master load means, wherein further said motor provides a leading shaft position signal therefrom effectively indicative of the said rotating member position;
   c. slave motor means having an electric power input thereto, providing a rotating shaft member therefrom usually coupled to a slave load means, wherein further said motor is adapted to provide a following shaft position signal therefrom effectively indicative of the said rotating member position;
   d. control means coupled effectively between said power source and the electric power input of the said slave motor means; providing a first power signal to said slave motor which enables the motor to rotate at least nearly synchronously with the power source frequency component; providing a second power signal to said motor which serves to controllably spoil the motor's ability to rotate at least nearly synchronously with the frequency component of the A.C. power signal coupled thereto and thereby effectively retard the rotational speed of the motor; said first power signal being coupled both effectively alone and in combination with the said second power signal as selected therebetween by an error control signal applied to an input thereto;
   e. combining means effective to accept at least the said leading shaft position signal and the said following shaft position signal and adaptively producing at least a two state error control signal therefrom; whereby a first state signal is produced when the angular position of the said leading and following shaft position signals are coincident and at least a second state signal is produced when the said angular positions are noncoincident; being therefrom coupled with the corresponding control means input and effective therewith to produce a said first power signal therefrom when the said master and slave motor rotating members are angularly synchronized; further producing a said second power signal therefrom, usually in combination with said first power signal, when said master and slave motor rotating members are angularly displaced.

4. Motor synchronization apparatus of claim 3 wherein said induction motor means are synchronous in speed with the said power source frequency component.

5. Motor synchronization apparatus of claim 3 wherein at least the said slave motor comprises a stator means providing at least two running windings; with one winding thereof coupled in a substantially direct way with said alternating current power source; while the second winding thereof is coupled substantially in series with a phase shift capacitor to said alternating current power, thereby producing a fixed electrical phase shift between the two windings which develops a rotational magnetic field which serves to envelop the motor rotor and produce rotation of the shaft member at about maximum, and usually frequency synchronous, mechanical speed.

6. Motor synchronization apparatus to claim 5 wherein the second control means includes in part, at least, the phase shift capacitor in combination with an impedance changing means coupled between the power source and the second winding of the slave motor means, whereby said impedance changing means receives the error signal coupled from the combining means to produce an effective capacitor impedance and resulting phase shaft of substantially optimum value when said first power signal alone is called for by the first state error signal; and, to produce an effective capacitor impedance and resulting phase shift of other than about optimum value when said second power signal is called for by the second state error signal; the overall effect being that, when the phase shift is about optimum, substantially maximum and at least nearly synchronous motor speed is produced; whereas when the phase shift in other than about optimum, the speed of the motor is retarded albeit the power signal frequency remains substantially constant.

7. Motor synchronization apparatus of claim 3 wherein said shaft position signals are each produced by angle responsive sensor means separately coupled with each master and slave rotating shaft member means.

8. Motor synchronization apparatus of claim 7 wherein said sensor means comprises a light source and light detector means effectively responsive to the position of a shutter means situate therebetween, whereby said shutter means is mechanically synchronized with the angular position of the shaft member.

9. Motor synchronization apparatus of claim 7 wherein said sensor means comprises an inductive pickup means responsive to a magnetic field altering flag means mechanically related to the angular position of the shaft member.

10. Motor synchronization apparatus of claim 3 wherein said shaft position signals are substantially separate pulse train signals comprising pulse component signals each of a time duration proportional to the respective shaft rotational velocities; wherein the leading shaft position signal has a duration exceeding the duration of the following shaft position signal.

11. Motor synchronization apparatus of claim 3 wherein said control means switches between the several first power signal and second power signal combinations in effective synchronization with the substantially constant frequency alternating current power source waveform zero crossover level.

12. Motor shaft angle synchronization apparatus effective to provide coincidence of the absolute angular relationship between the rotating shaft members of at least two electric machines; comprising:
  a. master machine means including a rotating shaft member coupled with an electric induction motor;
  b. slave machine means, each including a rotating shaft member coupled with an electric induction motor;
  c. master sensor means coupled with said master machine means and adapted to produce a leading rotating shaft member position signal therefrom;
  d. slave sensor means coupled with said slave machine means adapted to produce a following rotating shaft member position signal therefrom;
  e. source means of first frequency alternating current power, coupled at least to said master machine means for excitation of said motor;
  f. control means having a power input means coupled with said first frequency source means; having a power output means of substantially the same frequency coupled with said slave machine means for excitation of said motor; having a control input means thereto for receiving at least a two-state control signal whereby the first state enables the control means to produce effective normal speed operation of the slave machine means and further whereby the second state enables the control means to modify the efficacity of the electric power coupled therethrough to produce some electrical retardation of the slave machine means normal speed;
  g. combining means effective to accept at least the said leading and the said following rotation shaft member position signals from said sensor means and adaptively producing an error signal therefrom which results in at least a two-state control signal coupled with said control means; whereby at least a first stage signal is produced when the angular positions of the said master and said slave machine means said rotating shaft members are properly coincident; whereby further a second state signal is produced when the coincidence between the angular positions of the said master and said slave machine means said rotating shaft member is displaced.

13. Motor synchronization apparatus of claim 1 wherein each motor means comprises a substantially synchronous induction motor means, the intrinsic normal speed of which is principally determined by the power source first frequency component.

14. Motor synchronization apparatus of claim 12 wherein at least the said slave motor comprises at least two running windings on a field assembly; with one winding thereof coupled in a substantially direct way with said power source; whilst the second winding thereof couples to the said power source through a phase shifting impedance means, thereby producing a relatively constant electrical phase shift between the two windings resulting in a rotating magnetic field proximate with the field assembly which acts to induce a relative mechanical rotational effect between the field assembly and a rotor assembly, one of which couples to the machine means rotating shaft member while the other is fixed, substantially stationary, relative to the rotating member.

15. Motor synchronization apparatus of claim 14 wherein said phase shifting impedance means is an electrical capacitor.

16. Motor synchronization apparatus of claim 1 wherein the said control means includes in part the phase shifting impedance means in combination with an impedance changing means coupled between the power source and the second winding of the slave motor means, whereby said impedance changing means receives the error signal coupled from the combining means to produce an effective phase shift impedance of substantially optimum value when said normal speed operation of the slave machine means is called for by the first state error signal; and, to produce an effective phase shift impedance which is other than about optimum value when retardation of the slave machine means speed is called for by the second state error signal thereby establishing a slippage of the slave machine speed relative to the master machine speed until angular synchronization is achieved, whereupon the slave machine and master machine speed are effectivley synchronized and a constant angular relationship is maintained therebetween.

17. Motor synchronization apparatus of claim 12 wherein said sensor means comprises a light source and light detector means effectively responsive to the position of a shutter means positioned therebetween, whereby said shutter means is mechanically synchronized with the angular position of the shaft member.

18. Motor synchronization apparatus of claim 12 wherein said sensor means comprises an inductive pickup means responsive to a magnetic field altering flag means mechanically related to the angular position of the shaft member.

19. Motor synchronization apparatus of claim 12 wherein said sensor means comprises a capacitive pickup means responsive to an electrostatic field altering flag means mechanically related to the angular position of the shaft member.

20. Motor synchronization apparatus of claim 12 wherein said shaft member position signals are substantially separate pulses train signals comprising pulse component signals each of a time duration proportional to the respective shaft rotational velocities; wherein the leading shaft member position signal has a duration exceeding the duration of the following shaft member postion signal.

21. Motor synchronization apparatus of claim 12 wherein said two state control signal switches between states in effective synchronization with the first frequency alternating current power source waveform zero crossover level.

22. Motor synchronization apparatus of claim 12 wherein:
a. said leading shaft member position signal couples with the first input of a combinatorial logic gate;
b. said following shaft member position signal couples with the second input of a combinatorial logic gate and the input of a signal delay means;
c. said combinatorial logic gate provide an output signal therefrom of a first level when both effective inputs thereto are in logical agreement, and a second level when both effective inputs thereto are in logical disagreement, with the output signal coupled to the DATA input of a first edge triggered flip-flop;
d. said signal delay means provides a slightly delayed pulse signal efficacious as the CLOCK input for the said flip-flop and effective therewith to transfer the instant DATA input state to a flip-flop output;
e. switch means having a control input thereto coupled with said first flip-flop output, adapted to coact with the slave machine means to retard the slave rotating shaft member speed when said flip-flop output level is of the value produced by non-coincidence of the several shaft member position signals, and is further adapted to coact with the slave machine means for normal speed rotating shaft member operation when said flip-flop output level is of the value produced by coincidence of the several shaft member position signals.

23. Motor synchronization apparatus of claim 22 wherein further:
a. a second edge triggered flip-flop having at least a DATA input, a CLOCK input, and an output; with said DATA input coupled with said first flip-flop output; with several flip-flop output coupled with said switch means control input;
b. zero cross-signal source effective to adapt the alternating current power waveform into a pulse signal coupled to said second flip-flop CLOCK input therewith serving to transfer the second flip-flop DATA input signal to the OUTPUT thereof near the instant when the alternating current power is of minimum value.

24. Motor synchronization apparatus of claim 22 wherein said signal delay means comprises at least an integrator, usually including a resistance and a reactance element, whereby the applied following shaft member position signal is delayed in time effectively less than the time period of the efficacious level of the signal produced at the output of the combinatorial logic gate when at least near coincidence between the leading and the following shaft member position signals exists.

25. Motor synchronization apparatus of claim 12 wherein the said leading rotating shaft member position signal has an effective duration exceeding that of the following rotating shaft member position signal.

26. Motor synchronization apparatus of claim 12 wherein specifically said slave machine means is plural, with each machine means synchronized in a substantially separate way with said master machine means.

27. Motor shaft angle synchronization apparatus effective to provide coincidence of the absolute angular relationship between the rotating shaft members of at least two electric machines, comprising:
a. master machine means including a rotating shaft member coupled with a master electric induction motor;
b. slave machine means each including a rotating shaft member coupled with a slave electric induction motor;
c. retardation means coupled with each slave machine means said rotating shaft member effective to modify the momentary rotational speed thereof;
d. master sensor means coupled with said master machine means and adapted to produce a leading rotating shaft member position signal therefrom;
e. slave sensor means coupled with said master machine means and adapted to produce a following rotating shaft member position signal therefrom;
f. source means of first frequency alternating current power, coupled at least to said master machine means for normal speed excitation of said master motor and to said slave machine means for normal speed excitation of said slave motor;
g. combining means effective to accept at least the said leading and the said following rotating shaft member position signals from said sensor means and adaptively produce an error signal therefrom which results in at least a two state control signal coupled with said retardation means; whereby a first state signal is produced when the angular positions of the said master and said slave machine means said rotating shaft members are properly coincident which produces a minimum retardation means effect; and, whereby further a second state signal is produced when the coincidence between the angular positions of the said master and the said slave machine means rotating shaft member is displaced which produces a maximum retardation means effect whilst substantially the same first frequency power is coupled with each the several master and slave machine motors.

28. Motor synchronization apparatus of claim 27 wherein said retardation means is an electrically actuated mechanical braking device.

29. Motor synchronization apparatus of claim 27 wherein said retardation means is a dynamic inductive field opposition braking device.

30. Motor synchronization apparatus of claim 29 wherein said braking device is an induction motor means with the rotor thereof coupled with the rotating shaft member, whereby the control signal therefore is substantially a direct electric current which establishes a unipolar magnetic field in the stator which resists the rotor motion.

31. Motor synchronization apparatus of claim 27 wherein said retardation means is produced as an effect through applying the control signal as a predetermined direct current level in combination with the first frequency alternating current power signal on at least one of the electric induction motor windings comprising the said slave machine means, thereby serving to bias the motor with a unipolar magnetic field which resists free rotation of the motor's rotor.

* * * * *

UNITED STATES PATENT AND TRADEMARK OFFICE
CERTIFICATE OF CORRECTION

PATENT NO. : 4,405,884
DATED : Sept. 20, 1983
INVENTOR(S) : Harold J. Weber

It is certified that error appears in the above-identified patent and that said Letters Patent are hereby corrected as shown below:

Col. 10, Claim 13, Line 1 thereof

"claim 1" should read --claim 23--.

Col. 10, Claim 16, Line 1 thereof

"claim 1" should read --claim 14--.

Signed and Sealed this

Eleventh Day of September 1984

[SEAL]

Attest:

Attesting Officer

GERALD J. MOSSINGHOFF

Commissioner of Patents and Trademarks